(12) United States Patent
Jazdzewski

(10) Patent No.: US 8,166,449 B2
(45) Date of Patent: Apr. 24, 2012

(54) LIVE BIDIRECTIONAL SYNCHRONIZING OF A VISUAL AND A TEXTUAL REPRESENTATION

(75) Inventor: Charles P. Jazdzewski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1131 days.

(21) Appl. No.: 12/015,520

(22) Filed: Jan. 17, 2008

(65) Prior Publication Data

US 2009/0187882 A1   Jul. 23, 2009

(51) Int. Cl.
*G06F 9/44* (2006.01)

(52) U.S. Cl. ........ 717/100; 717/106; 717/109; 717/110; 717/113

(58) Field of Classification Search .................. 717/100, 717/104–113
See application file for complete search history.

(56) References Cited

U.S. PATENT DOCUMENTS

| | | | |
|---|---|---|---|
| 6,404,438 B1 | 6/2002 | Hatlelid et al. | |
| 6,466,240 B1 * | 10/2002 | Maslov | 715/234 |
| 6,681,370 B2 | 1/2004 | Gounares et al. | |
| 6,851,107 B1 * | 2/2005 | Coad et al. | 717/108 |
| 6,865,599 B2 * | 3/2005 | Zhang | 709/218 |
| 7,239,320 B1 | 7/2007 | Hall et al. | |
| 7,275,212 B2 * | 9/2007 | Leichtling | 715/733 |
| 7,370,315 B1 * | 5/2008 | Lovell et al. | 717/100 |
| 7,480,897 B2 * | 1/2009 | Reinhardt et al. | 717/120 |
| 7,802,179 B2 * | 9/2010 | Bissonnette et al. | 715/229 |
| 7,856,621 B2 * | 12/2010 | Plante | 717/122 |
| 2003/0101235 A1 * | 5/2003 | Zhang | 709/218 |
| 2005/0261787 A1 * | 11/2005 | Plante | 700/30 |
| 2006/0197659 A1 | 9/2006 | Farrows | |
| 2006/0206865 A1 * | 9/2006 | Reinhardt et al. | 717/108 |
| 2007/0209031 A1 * | 9/2007 | Ortal et al. | 717/104 |
| 2007/0226196 A1 | 9/2007 | Adya et al. | |
| 2007/0226730 A1 * | 9/2007 | Coyle et al. | 717/170 |
| 2008/0155397 A1 * | 6/2008 | Bissonnette et al. | 715/256 |
| 2009/0100405 A1 * | 4/2009 | Belenky et al. | 717/104 |

FOREIGN PATENT DOCUMENTS

WO    2004021219 A3   3/2004

OTHER PUBLICATIONS

"Identity Aggregation and Synchronization", http://www.microsoft.com/technet/security/guidance/identitymanagement/idmanage/P2Ident_3.mspx?mfr=true, published on May 11, 2004.
"Visual Comparer 1.60", http://visual-comparer.nikeware.qarchive.org/, downloaded on Nov. 13, 2007.

* cited by examiner

*Primary Examiner* — Wei Zhen
*Assistant Examiner* — Qing Chen

(57) ABSTRACT

Various technologies and techniques are disclosed performing a bidirectional synchronization between a visual representation and a textual representation. A visual representation of a file is synchronized with a textual representation of a file using a same delta propagation that is used to synchronize the textual representation with the visual representation. A semantic view is generated for the visual representation, and a separate semantic view is generated for the textual representation of the file. The visual representation and the textual representation follow a same semantic structure for comparison. To perform synchronization after changes are made to one of the representations, a synchronization process is performed using the semantic views to update the other representation.

8 Claims, 11 Drawing Sheets

LIVE BIDIRECTIONAL SYNCHRONIZING OF A VISUAL AND A TEXTUAL REPRESENTATION

BACKGROUND

In today's world of technology, users can create documents and software in a variety of ways. Web sites, for example, can be created using HyperText Markup Language (HTML) or another markup language. HTML is a text-based markup language that can be viewed in source code form by opening the text file. HTML is also then rendered by a web browser or other program in a visual form, such as web page. The eXtensible Application Markup Language (XAML) created by MICROSOFT® is another example of a text-based markup language that allows users to write source code that gets transformed into a visual format. XAML simplifies the creation of a user interface for the MICROSOFT® .NET Framework programming model.

Some markup language design programs allow for editing of a visual representation of the file as well as a textual representation of the file. For example, MICROSOFT® FrontPage and Adobe Dreamweaver are web development programs that allow a "split-pane" view where users can see the textual representation (e.g. source code) of the file side-by-side with the visual representation of the file that shows how the file will visually look to an end user when transformed and interpreted. By viewing the visual representation after changing the textual representation, the user can see what impact the changes he/she made to the source code had on the visual representation of that same file. After changing the visual representation, the user can also see what impact those visual changes had on the textual representation to make sure the newly added source code is written in the desired format.

However, changes that are made in either representation are not automatically propagated to the other representation automatically. In some instances, the user has to activate the view that needs updated, or take some other affirmative action to cause the outdated view to be updated.

SUMMARY

Various technologies and techniques are disclosed performing a bidirectional synchronization between a visual representation and a textual representation. A visual representation of a file is synchronized with a textual representation of a file using a same delta propagation that is used to synchronize the textual representation with the visual representation. A semantic view is generated for the visual representation, and a separate semantic view is generated for the textual representation of the file. The visual representation and the textual representation follow a same semantic structure for comparison. To perform synchronization after changes are made to one of the representations, a synchronization process is performed using the semantic views to update the other representation.

In one implementation, a method for parsing only part of a representation of a file to produce a delta of changes that need synchronized with another representation of a file is described. A lookup table is generated for the first representation that is based upon an updated version of a semantic view of the first representation. A lookup table for a second representation is generated that is based upon an outdated version of a semantic view of the second representation that needs updated with changes made to the first representation. The lookup tables are used to produce a delta of changes that were made to the first representation. The delta can then be applied to update the second representation.

In another implementation, a method for producing a delta of changes that need synchronized with another representation of a file is described. A semantic view is generated for a first representation of a file. A semantic view is generated for a second representation of the file. The first representation and the second representation follow a same semantic structure for comparison. Changes made to a first representation of the file are detected. Information is saved regarding which nodes in the file have changed along with details about the scope of the change. A lookup table is generated for the first representation using the saved information regarding which nodes have changed. A lookup table is generated for the second representation that is based upon an outdated version of the semantic view of the second representation. The lookup table for the first representation and the lookup table for the second representation are used to produce a delta of changes that were made to the first representation. The delta can then be applied to update the second representation.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as an application that performing a bidirectional synchronization between a visual representation and a textual representation, but the technologies and techniques also serve other purposes in addition to these. In one implementation, one or more of the techniques described herein can be implemented as features within a visual designer program such as MICROSOFT® VISUAL STUDIO®, MICROSOFT® Expression Web, MICROSOFT® XAML Editor, Adobe Dreamweaver, or from any other type of program or service that allows for manipulation of one files using both textual and visual representations. In another implementation, one or more of the techniques described herein are implemented as features with other applications that deal with other types of representations of a file than just visual and textual representations, such as textual and audible representations.

Figure 1:
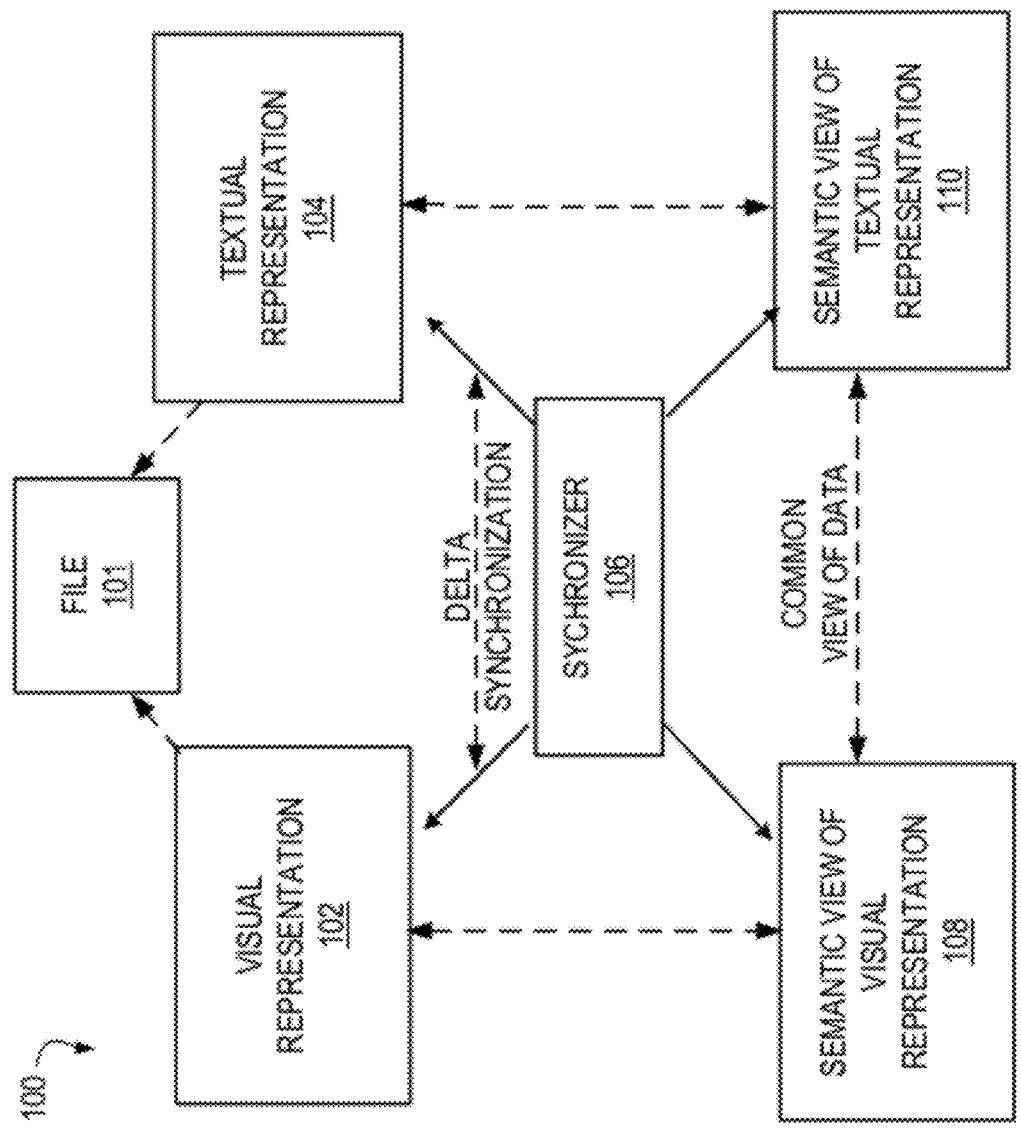
FIG. 1 is a diagrammatic view of a bidirectional synchronization system of one implementation.

FIG. 1 is a diagrammatic view of a bidirectional synchronization system 100 of one implementation that keeps a visual representation 102 of a file 101 synchronized with a textual representation 104 of the file 101 and vice versa. The term "file" as used herein is meant to include one or more files, database entries, or any other storage structure for persisting data. The term "visual representation" as used herein is meant to include what file 101 looks like in a visual format once its contents are interpreted. Thus, visual representation 102 can include a visual representation of a file containing code written in an XAML, HTML, or other text-based markup language, to name a few non-limiting examples. The term "textual representation" as used herein is meant to include what file 101 looks like in its textual form. Thus, textual representation 104 can include the actual source code of a file written using XAML, HTML, or other text-based markup language, to name a few non-limiting examples.

A synchronizer 106 creates a semantic view of the visual representation 108 and a semantic view of the textual representation 110. In order to synchronize the textual representation with the visual representation and vice versa, the state of each need to be accessed through a common view of the data. This "common view" of the data is captured by creating a semantic view of the data for the visual representation 102 and the textual representation 104. Each semantic view (108 and 110, respectively) includes information that is semantically relevant to both representations of a given file. Items that are not semantically relevant, such as comments, certain types of formatting, etc. can be excluded from the semantic view to save processing resources. In one implementation, the semantic views are created in the form of semantic trees, which represent the data in the file in a hierarchical fashion. The creation of the semantic views is described in further detail in FIGS. 2-3. Once the synchronizer generates the semantic views (108 and 110), a synchronization process is performed automatically to keep the visual representation and the textual representation up to date with each other. In one implementation, the synchronization is automatically triggered by change notifications. The synchronization process is described in further detail in FIGS. 4-10 herein.

It should be appreciated that textual representations and visual representations are used herein for the sake of illustration. However, in other implementations, there could be other types of representations not specifically discussed herein, such as audible representations, video representations, or any other type of representation where more than one representation of the same file or data structure could be provided. Furthermore, it will be appreciated that two representations are discussed in the examples herein, but that in some instances, more than two representations could also be used. In such cases, any reference to two representations would be replaced with the suitable adjustments that would handle three or more representations. For example, there could be textual representations, visual representation, and audible representations kept in synchronization with each other.

Turning now to FIGS. 2-10, the stages for implementing one or more implementations of bidirectional synchronization system 100 are described in further detail. In some implementations, the processes of FIG. 2-10 are at least partially implemented in the operating logic of computing device 500 (of FIG. 11).

Figure 2:
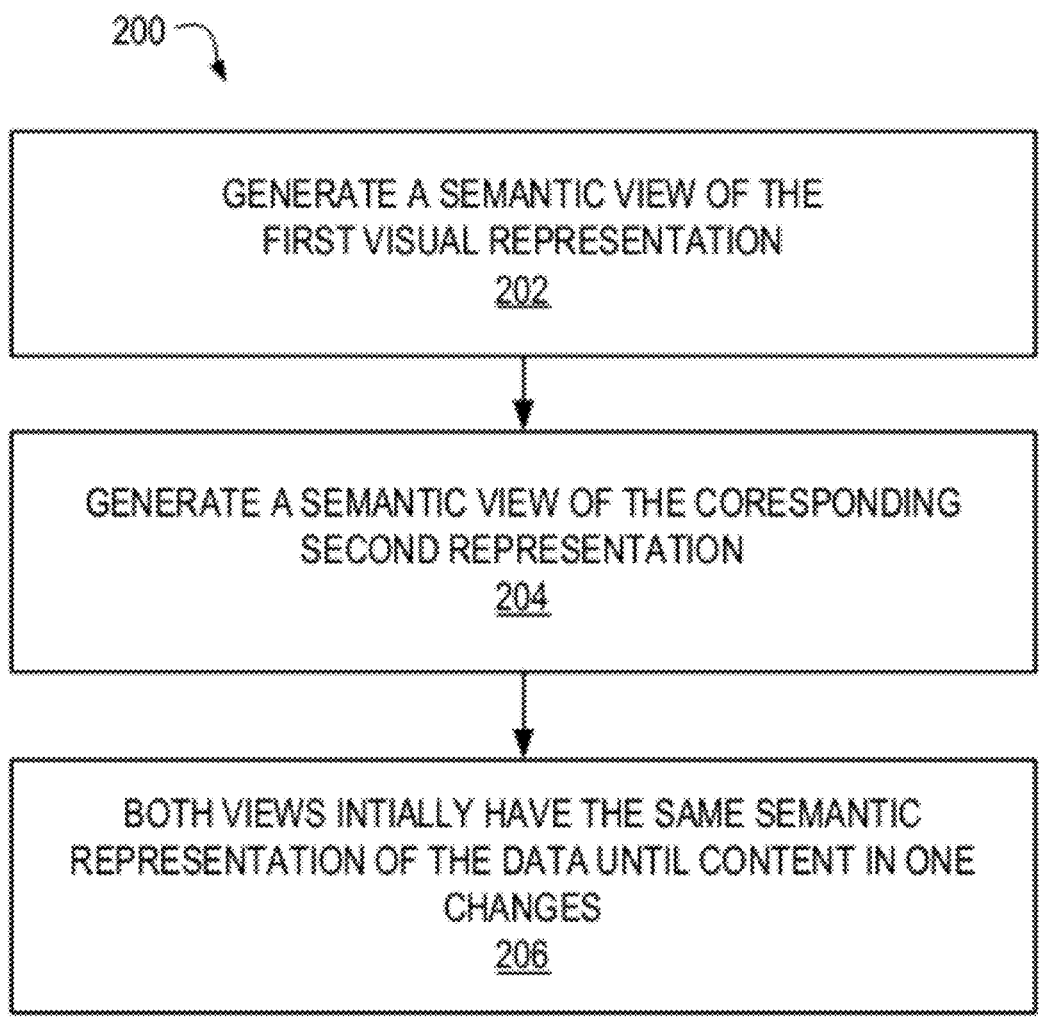
FIG. 2 is a process flow diagram for one implementation illustrating the stages involved in generating semantic views for the representations.

FIG. 2 is a process flow diagram 200 that illustrates one implementation of the stages involved in generating semantic views for the representations. A semantic view is generated for the first representation (which could be a visual representation, textual representation, etc.) (stage 202). A semantic view is also generated for the second representation (stage 204), either before, after, or at the same time as the first representation. Both semantic views have the same semantic representation of the data in the file until content in one of them changes (stage 206). In other words, before anything has been changed in either representation, the semantic views of each should be identical.

Figure 3:
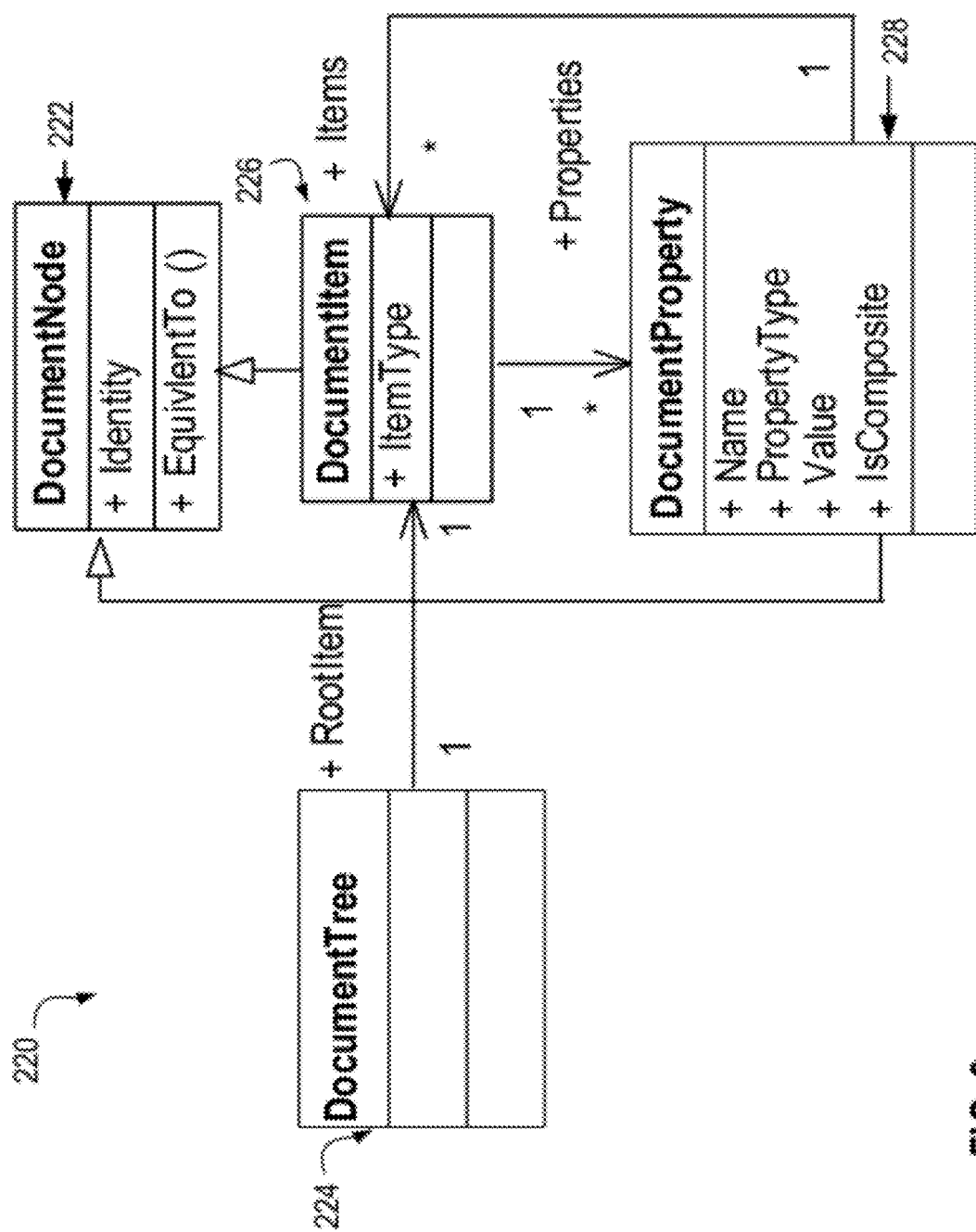
FIG. 3 is a diagrammatic view of one implementation illustrating an exemplary structure for the semantic views of the representations.

As noted earlier, by having the state of each representation accessible through a common view of the data (the semantic view), the changes to one representation can be more easily made to the other. For sake of illustration, an exemplary structure for creating the semantic views of the representations is shown in FIG. 3. The representation shown in FIG. 3 could be used with a markup language such as XAML. A DocumentTree 224 has a single root item 226. A DocumentItem 226 can have multiple DocumentProperties 228. Each DocumentProperty 228 can either be a simple value or contain a list of items. IsComposite indicates which whether a property contains items or a value. IsComposite true indicates the property is a list of items. The identity of each node is unique to the entire semantic view, and needs to match between semantic views so that the same element is referred to with the same unique identity in both semantic views.

DocumentNode 222 is the ancestor type of both DocumentItem 226 and DocumentProperty 228, meaning that both DocumentItem 226 and DocumentProperty 228 have the Identity property and EquivalentTo( ) methods. Additionally, DocumentNode 222 forms an abstraction that can be used in other parts of the program. For example, the table created is a table of DocumentNode's that can be compared for equivalence using EquivalentTo( ) and the table is keyed by Identity.

Figure 4:
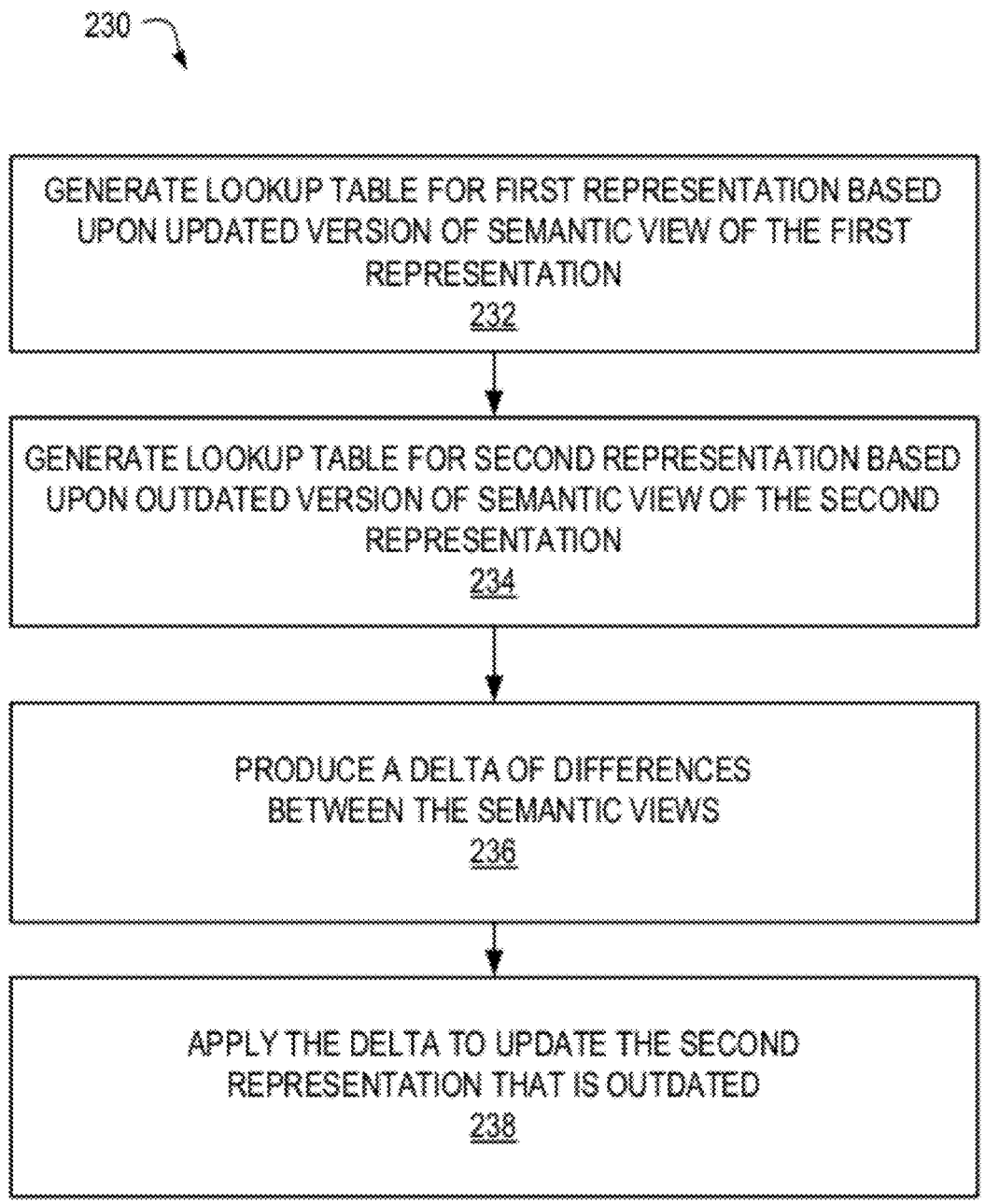
FIG. 4 is a process flow diagram for one implementation illustrating the stages involved in producing a delta of differences and using the delta to update the representation that is outdated.

Turning now to FIGS. 4-10, a discussion is provided on how the semantic views of the data are used to synchronize changes made to one of the representations with the other representation(s). FIG. 4 is a process flow diagram 230 that illustrates one implementation of the stages involved in producing a delta of differences and using the delta to update the representation that is outdated. In one implementation, the process of FIG. 2 is performed, and then the process of FIG. 4 is initiated when changes have been made to one of the representations that need synchronized with the other.

A lookup table is generated for a first representation based upon an updated version of the semantic view of the first representation (stage 232) (also referred to herein as the "new semantic view"). In other words, once the semantic view was created for the first representation and the end user made changes to the representation, the semantic view of that representation was updated. A lookup table is generated from that updated view of the data (stage 232). A lookup table is generated for the second representation based upon the outdated version of the semantic view of the second representation (stage 234) (also referred to herein as the "old semantic view", since it is outdated). The lookup table generation process is described in further detail in FIG. 5. Using the lookup tables, a delta is produced of the differences between the semantic views (stage 236), as described in further detail in FIGS. 6-7. The delta is then applied to the second representation to update the second implementation with the changes that were made to the first representation, as described in further detail in FIG. 8.

Figure 5:
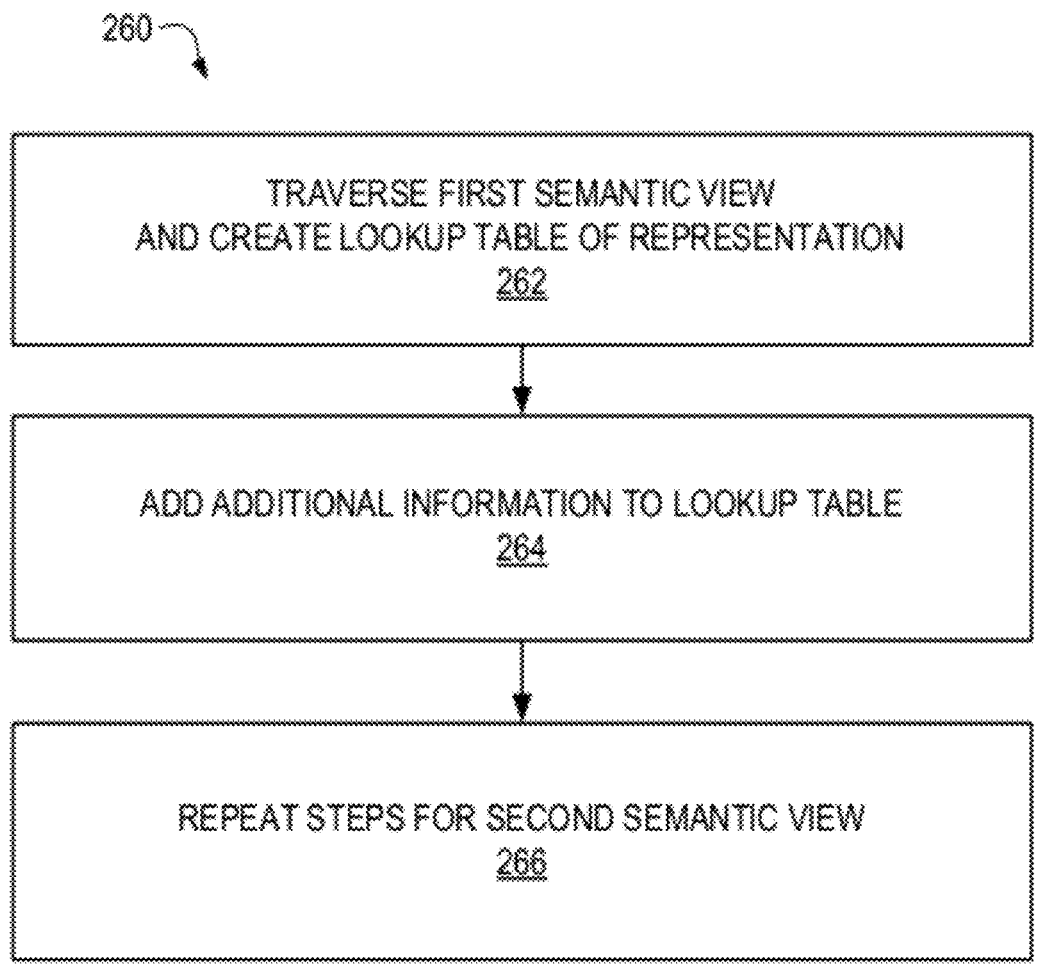
FIG. 5 is a process flow diagram for one implementation illustrating the stages involved in creating the lookup tables for the representations that are used for producing the delta of differences between the representations.

FIG. 5 is a process flow diagram 260 that illustrates one implementation of the stages involved in creating the lookup tables for the representations that are used for producing the delta of differences between the representations. The first semantic view is traversed to create a lookup table for the first representation (stage 262). The lookup table can be in a file, database, or any other type of data structure that will allow information to be retrieved. In one implementation, the lookup table is keyed using an identity of each node in the semantic view. The identity for a text element can be any type of identifier that is the same even when that file has been modified. Any approach that produces a unique identity (i.e. such as file annotation) can work as long as each reading of the text representation produces the same identity. One implementation uses text ranges to track identity and uses notifications from the text editor to update the text ranges when text is inserted or deleted. Additional information is also added to the lookup table as needed (stage 264). In one implementation, the container of each node and the order the item in the list of items of its container property also need to be added to the lookup table in addition to the nodes and the identities. The lookup table for the first representation (that changed) is referred to herein as the "new lookup table". Stages 262 and 264 are repeated for the semantic view of the second representation to create the lookup table for the second representation that needs to be updated because it is outdated. The lookup table for the second representation is referred to herein as the "old lookup table". The same unique identities are used for values in the old lookup table as those that are used in the new lookup table, so that the two tables can be compared.

Figure 6:
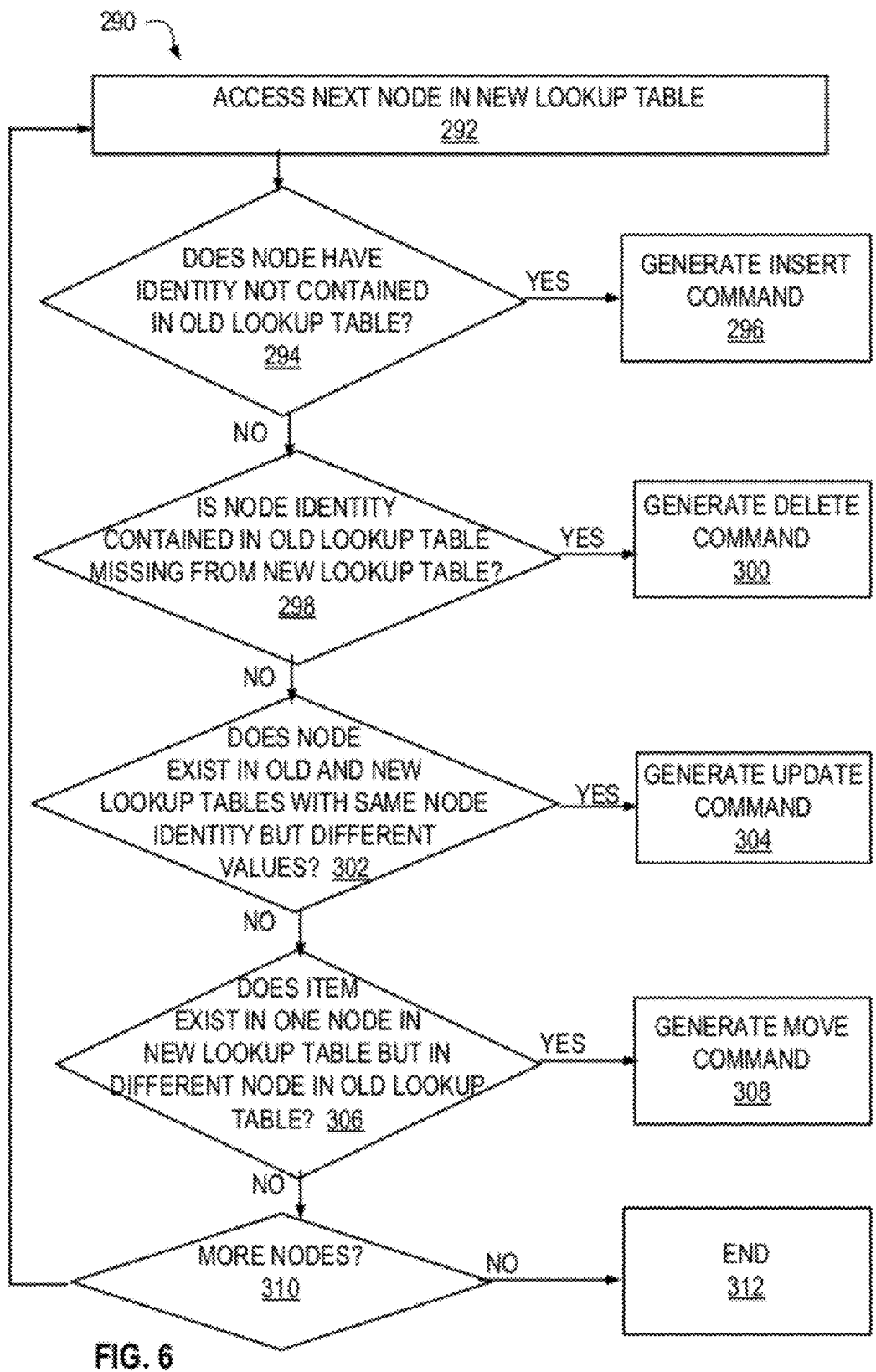
FIG. 6 is a process flow diagram for one implementation illustrating the stages involved in determining the delta of differences between a first representation and a second representation.

FIG. 6 is a process flow diagram 290 that illustrates one implementation of the stages involved in determining the delta of differences between a first representation and a second representation. In one implementation, the semantic views are compared by traversing both semantic views, using a tree walking algorithm or other suitable technique. A node is accessed in the new lookup table (stage 292). If that node has an identity that is not contained in the old lookup table (decision point 294), then the node was inserted, and an insert command is generated (stage 296). In one implementation, if the node was inserted but the container was not also inserted, an insert command is generated with a copy of the node inserted into the container with the container's identity. If a node identity is contained in the old lookup table but not in the new lookup table (decision point 298), then the node was deleted, and a delete command is generated (stage 300). In one implementation, if the node was deleted but the container was not deleted, then a delete command is generated with the identity of the node deleted from the container with the container's identity.

If the node exists in both the old and the new lookup tables with the same node identity but different values (decision point 302), then the node was updated and an update command is generated (stage 304). In one implementation, an update command is generated with a copy of the new value of the property. In one implementation, only properties can be modified. If the item exists in one node in the new lookup table but in a different node in the old lookup table (decision point 306), then the item was moved and a move command is generated (stage 308). For example, a move command is generated to position the item into the new container (if necessary) following the item prior to it in the new collection. As another example, a move command is generated if the node moved within the same collection. For example, if button1 followed button2, but the first semantic view changed so that now button1 preceded button2, a move is generated. The process repeats for each additional node in the lookup table of the first representation (decision point 310). Once all the nodes have been processed, the process ends (stage 312).

Using the process described in FIG. 6, a delta is produced between the two semantic views that records the operations that need performed to the old semantic view to make the old semantic view match the values in the new semantic view. In the implementation described in FIG. 6, a list of one or more commands is generated that are later applied to the old semantic view once the traversal is finished (as described in further detail in FIG. 8). In another implementation, the updates can be made directly to the old semantic view while traversing the lookup tables.

Figure 7:
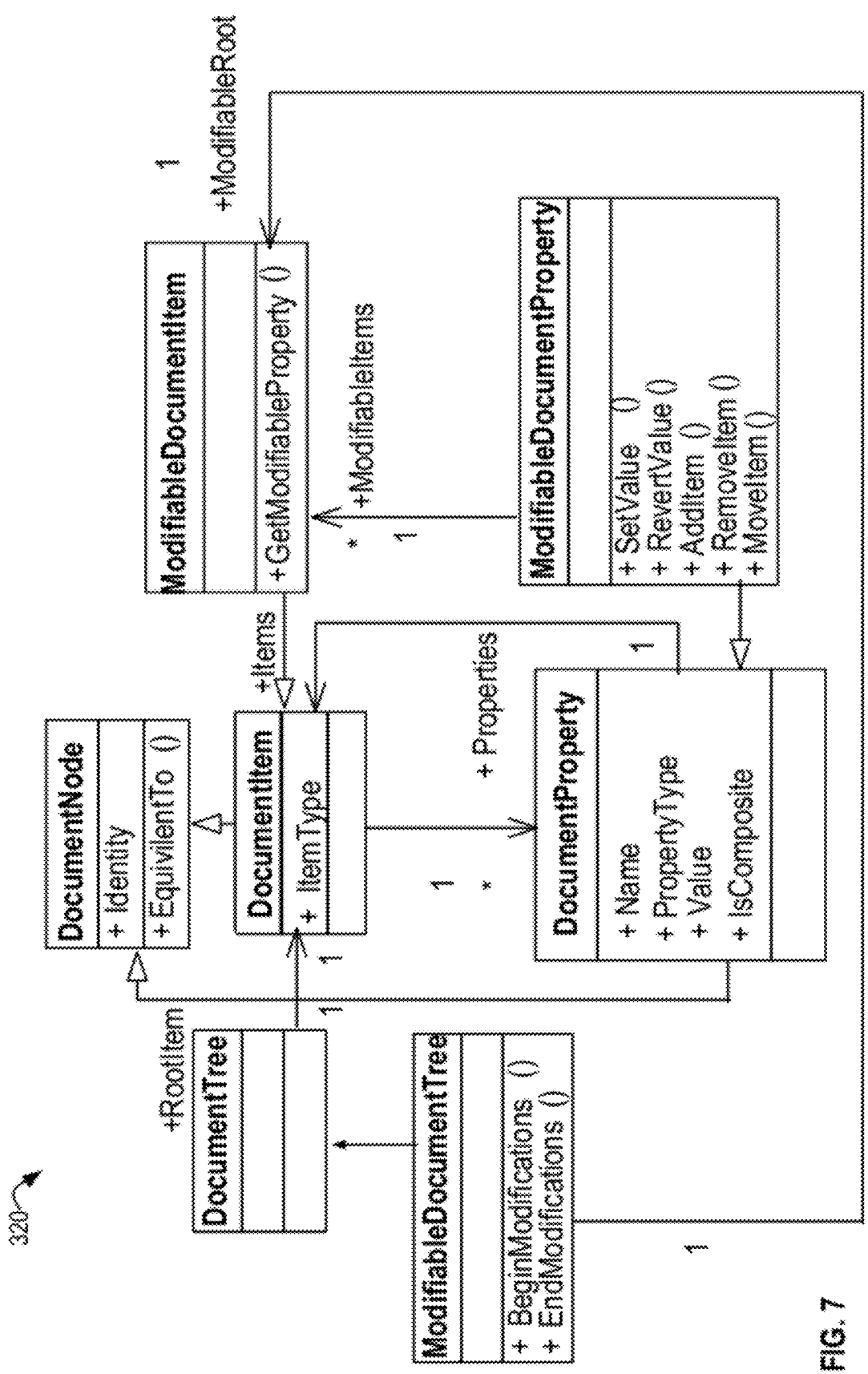
FIG. 7 is a diagrammatic view of one implementation that illustrates an exemplary structure for the semantic views of the representations that allow modifications to the semantic view contents.

FIG. 7 is a diagrammatic view 320 of one implementation that illustrates an exemplary structure for the semantic views of the representations that allow modifications to the semantic view contents. The representation shown in FIG. 7 could be used with a markup language such as XAML. The delta producing process described in FIG. 6 can be used to modify a semantic view that has the structure illustrated in FIG. 7 which supports modifications. FIG. 7 is just one example of many possible structures for providing a structure of a semantic view that allows updates.

Figure 8:
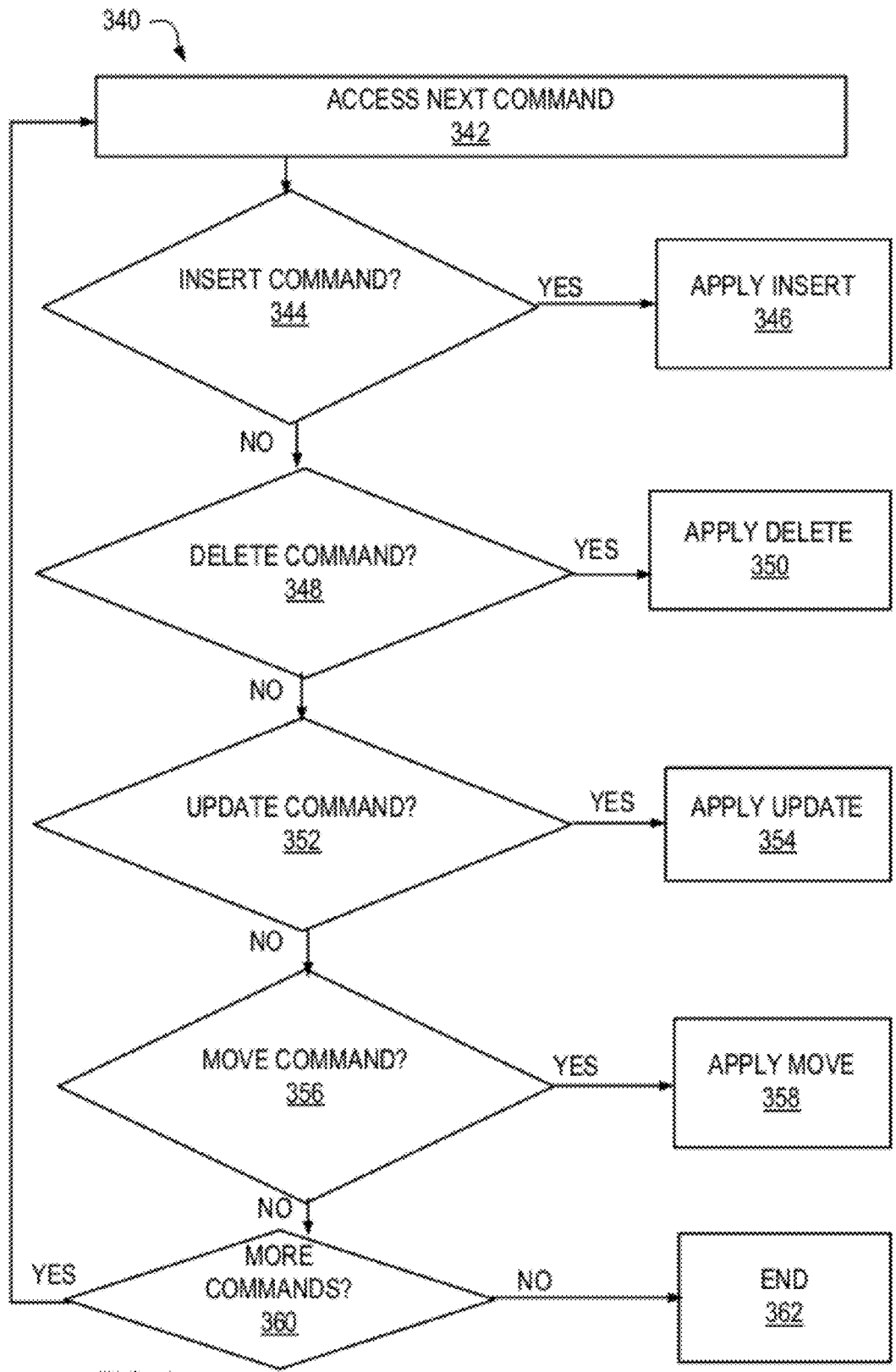
FIG. 8 is a process flow diagram for one implementation that illustrates the stages involved in applying the delta of differences to the second representation that is outdated.

FIG. 8 is a process flow diagram 340 that illustrates one implementation of the stages involved in applying the delta of differences to the second representation that is outdated. An input to the process of FIG. 8 is the list of commands created from FIG. 6 that contain updates that need applied the old lookup table (for the second representation that needs updated). The next command in the list is accessed (stage 342). If the command is an insert command (decision point 344), then the insert is applied to the old semantic view (stage 346). If the command is a delete command (decision point 348), then the delete is applied to the old semantic view (stage 350). If the command is an update command (decision point 352), then the update is applied to the old semantic view (stage 354). If the command is a move command (decision point 346), then the move is applied to the old semantic view (stage 358). The stages repeat to process all of the commands (decision point 360), and then the process ends (stage 362).

An example of how the updates can be applied to the old semantic view using a structure shown in FIG. 7 will now be described for the sake of illustration. For each Insert command, the following rules could apply: If the node inserted is a DocumentItem, then the container is a ModifiableDocumentProperty, and the container property in the table should be found, and AddItem( ) called with the inserted item. If the node is a property, the container is a ModifiableDocumentItem, the item can be found and GetModifiableProperty( ) called to get the modifiable property. If new property is composite, AddItem( ) can be called on the modifiable property with all the items in the items collection of the new item. If the new property is not composite, SetValue( ) can be called on the modifiable property with the value of the new property.

For each Delete command, if the node is DocumentProperty, the ModifiableDocumentProperty is found and RevertValue( ) is called. If the node is a DocumentItem, the ModifiableDocumentProperty that is the container is found and RemoveItem( ) is called with the identity of the item to be removed. For each Update command, the ModifiableDocumentProperty is found with the identity in the update command and SetValue( ) is called with the value. For each Move command, the ModifiableDocumentProperty is found that corresponds to the container and MoveItem( ) is called with the identity of the predecessor and the new item.

In one implementation, if the document tree doesn't support finding an arbitrary node by identity, a node table can be produced and used by the same traversal process used to produce the node table for the delta (or reused from when the delta was produced).

Figure 9:
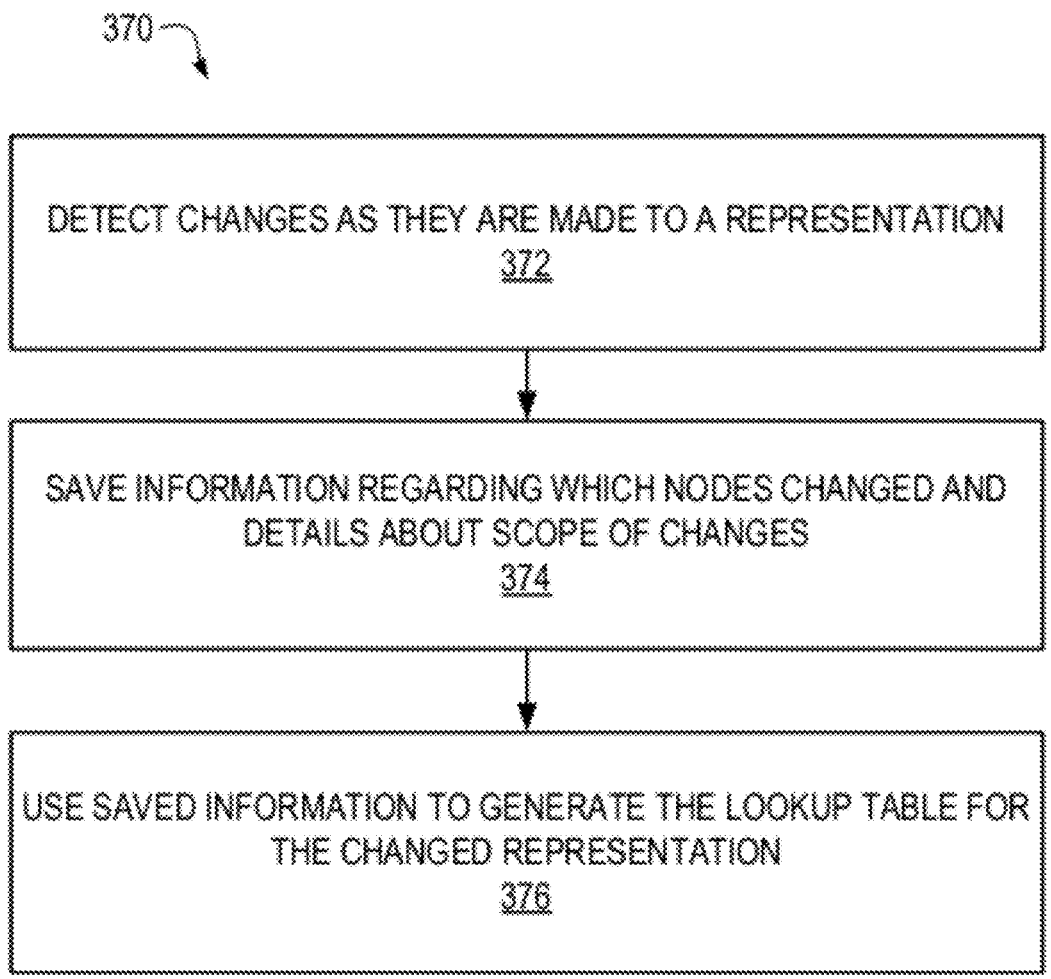
FIG. 9 is a process flow diagram for one implementation that illustrates the stages involved in tracking changes as they are made to a representation and using the tracked changes to reduce the size of the comparison needed to produce the delta of differences between representations.

Turning now to FIG. 9, an alternate implementation is described that illustrates an optimization that can be used to performing part of the synchronization process described herein. FIG. 9 is a process flow diagram 370 that illustrates one implementation of the stages involved in tracking changes as they are made to a representation and using the tracked changes to reduce the size of the comparison needed to produce the delta of differences between representations. The process shown in FIG. 9 can be used in a modified form in combination with the process described in FIGS. 2 and 4 (and/or other figures herein). Once the semantic views have been created as described in FIG. 2, then changes are detected as they are made to a particular representation (stage 372). Information is saved regarding which nodes changed and details about the scope of the changes (stage 374). The saved information of what was changed is then used to generate the lookup table for the changed representation (the first representation in earlier examples) (stage 376). In other words, the lookup table for the first representation is based upon only the nodes that were actually changed. In such a scenario, by having a lookup table that only contains nodes that were changed, the scope of the time needed to process the change is directly proportional to the amount of changes made (as opposed to the number of nodes in each semantic view as with the other implementation described herein).

Figure 10:
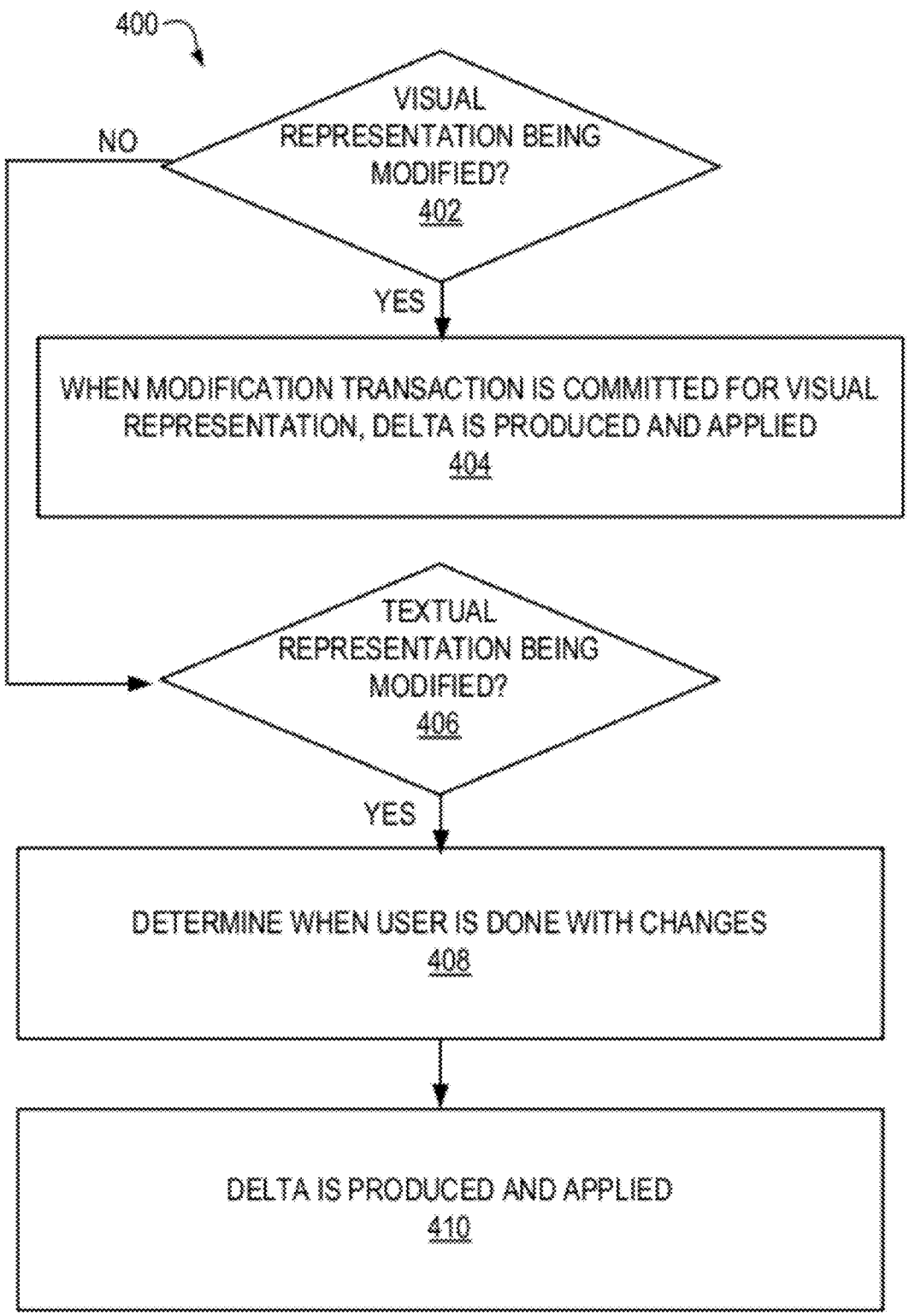
FIG. 10 is a process flow diagram for one implementation that illustrates the stages involved in performing live synchronizations between the visual representation and the textual representation as changes are made in either.

FIG. 10 is a process flow diagram 400 that illustrates one implementation of the stages involved in performing live synchronizations between the visual representation and the textual representation as changes are made in either representation. When the visual representation is being modified (decision point 402), the system waits for a modification transaction to be committed for the visual representation and then produces and generates the delta described earlier (stage 404). In one implementation, the boundary for a modification transaction is arbitrary and is determined by the system backing the semantic representation. For example, the modification transaction could be determined by the visual designer logic and could center around user action such as a drag operation. A drag operation might involve several changes to the tree but form one logical operation. The logical group is referred to as a modification transaction.

If the textual representation is the one being modified (stage 406), then the system determines when the user is done with the changes (stage 408) and then produces and applies the delta as described herein (stage 410). In one implementation, the system determines that the user is done with the changes by waiting for notifications from the host environment that indicates that the user has stopped typing and has produced a valid file. Once it is determined that a valid file is available, a delta is produced and that delta is applied to the visual representation. Text modification notifications used to update the text ranges above can also be used to produce changes described for the modified implementation described in FIG. 9.

Figure 11:
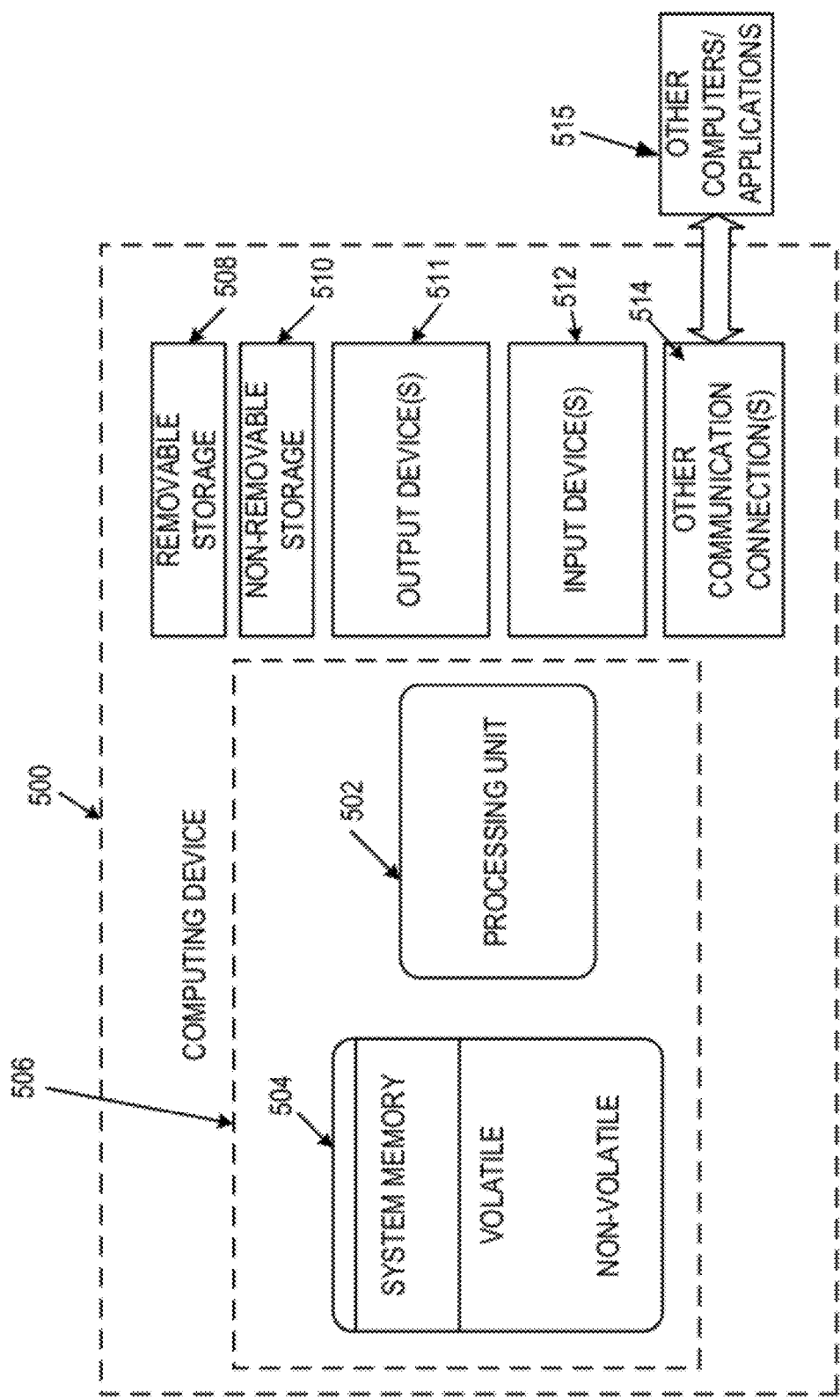
FIG. 11 is a diagrammatic view of a computer system of one implementation.

As shown in FIG. 11, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 11 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 11 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here. In one implementation, computing device 500 includes one or more parts of bidirectional synchronization system 100.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for parsing only a part of a representation of a file to produce a delta of changes that need to be synchronized with another representation of the file comprising the steps of:

employing a processor to execute computer executable instructions stored on a computer readable storage medium to implement the following acts:

generating a semantic view of a first representation of a file;

generating a semantic view of a second representation of the file, the first representation of the file and the second representation of the file following a same semantic structure for comparison;

generating a lookup table for the first representation of the file that is based upon an updated version of the semantic view of the first representation of the file;

generating a lookup table for the second representation of the file that is based upon an outdated version of the semantic view of the second representation of the file that needs to be updated with changes made to the first representation of the file;

comparing the lookup table for the first representation of the file and the lookup table for the second representation of the file to produce a delta of changes that were made to the first representation of the file;

applying the delta of changes to update the second representation of the file; and synchronizing a visual representation of the file with a textual representation of the file according to the delta of changes, wherein the visual representation of the file is one of the first representation of the file or the second representation of the file, and wherein the textual representation of the file is a different one of the first representation of the file or the second representation of the file relative to the visual representation of the file.

2. The method of claim 1, wherein the delta of changes that are produced comprise at least one command applicable to the second representation of the file to update the second representation of the file with changes made to the first representation of the file.

3. The method of claim 1, wherein the at least one command is selected from the group consisting of an insert command, a delete command, an update command, and a move command.

4. The method of claim 1, wherein the applying the delta of changes step comprises the steps of:

accessing a command applicable to the second representation of the file; and applying the command to the second representation of the file.

5. The method of claim 1, wherein the semantic view of the first representation of the file and the semantic view of the second representation of the file are included in semantic trees.

6. A method for producing a delta of changes from only a part of a representation of a file that need to be synchronized with another representation of the file comprising the steps of:

employing a processor to execute computer executable instructions stored on a computer readable storage medium to implement the following acts:

generating a semantic view of a first representation of a file;

generating a semantic view of a second representation of the file, the first representation of the file and the second representation of the file following a same semantic structure for comparison;

detecting changes made to the first representation of the file;

saving information regarding which nodes in the file have changed and details about a scope of the change;

generating a lookup table for the first representation of the file using the saved information regarding which nodes in the file have changed;

generating a lookup table for the second representation of the file that is based upon an outdated version of the semantic view of the second representation of the file that needs to be updated with changes made to the first representation of the file;

comparing the lookup table for the first representation of the file and the lookup table for the second representation of the file to produce a delta of changes that were made to the first representation of the file;

applying the delta of changes to update the second representation of the file; and synchronizing a visual representation of the file with a textual representation of the file according to the delta of changes, wherein the visual representation of the file is one of the first representation of the file or the second representation of the file, and wherein the textual representation of the file is a different one of the first representation of the file or the second representation of the file relative to the visual representation of the file.

7. The method of claim 6, wherein an amount of time needed to update the second representation of the file is proportional to a size of the changes that were made to the first representation of the file.

8. The method of claim 6, wherein the semantic view of the first representation of the file and the semantic view of the second representation of the file are included in semantic trees.

* * * * *